(12) United States Patent
Trombin et al.

(10) Patent No.: US 6,311,502 B1
(45) Date of Patent: Nov. 6, 2001

(54) DRYING PLANT FOR COMPRESSED AIR

(75) Inventors: Filippo Trombin; Massaro Fabio, both of Verona; Capellari Giovanni Battista, Udine, all of (IT)

(73) Assignee: O.M.I. Srl, Monfalcone (IT)

( * ) Notice: Subject to any disclaimer, the term of this patent is extended or adjusted under 35 U.S.C. 154(b) by 0 days.

(21) Appl. No.: 09/533,452

(22) Filed: Mar. 23, 2000

(30) Foreign Application Priority Data

Aug. 31, 1999 (IT) .............................................. UD99A0154

(51) Int. Cl.[7] .............................. F25D 17/06; F25D 21/00
(52) U.S. Cl. .................................................... 62/93; 62/272
(58) Field of Search .............................. 62/83, 271, 272, 62/94, 89, 150; 165/60

(56) References Cited

U.S. PATENT DOCUMENTS

| | | | |
|---|---|---|---|
| 4,287,724 | * | 9/1981 | Clark ........................................ 62/272 |
| 4,831,830 | * | 5/1989 | Swenson . | |
| 5,428,963 | * | 7/1995 | Korycki et al. ........................... 62/93 |
| 6,158,499 | * | 12/2000 | Rhodes et al. . | |

FOREIGN PATENT DOCUMENTS

0127711 * 12/1984 (EP) .

* cited by examiner

Primary Examiner—Henry Bennett
Assistant Examiner—Chen Wen Jiang
(74) Attorney, Agent, or Firm—Akin, Gump, Strauss, Hauer & Feld, L.L.P.

(57) ABSTRACT

An apparatus which dries compressed air by cooling it substantially to around its dew point. The apparatus includes at least a first heat exchanger, for the direct cooling of the compressed air, selectively associated with a refrigeration unit by a first refrigeration circuit. The first heat exchanger is immersed in a chamber containing a cooling liquid suitable to act as a thermal mass to accumulate the excess thermal energy generated by the refrigeration unit with respect to the energy needed to take the compressed air to dew point temperature. The apparatus also includes a second heat exchanger also immersed in the cooling liquid and suitable to intervene mainly during a momentary de-activation of the refrigeration unit. The apparatus is intended to dry compressed air with a high thermal yield and to substantially correlate energy consumption to the quantity of compressed air actually required.

15 Claims, 1 Drawing Sheet

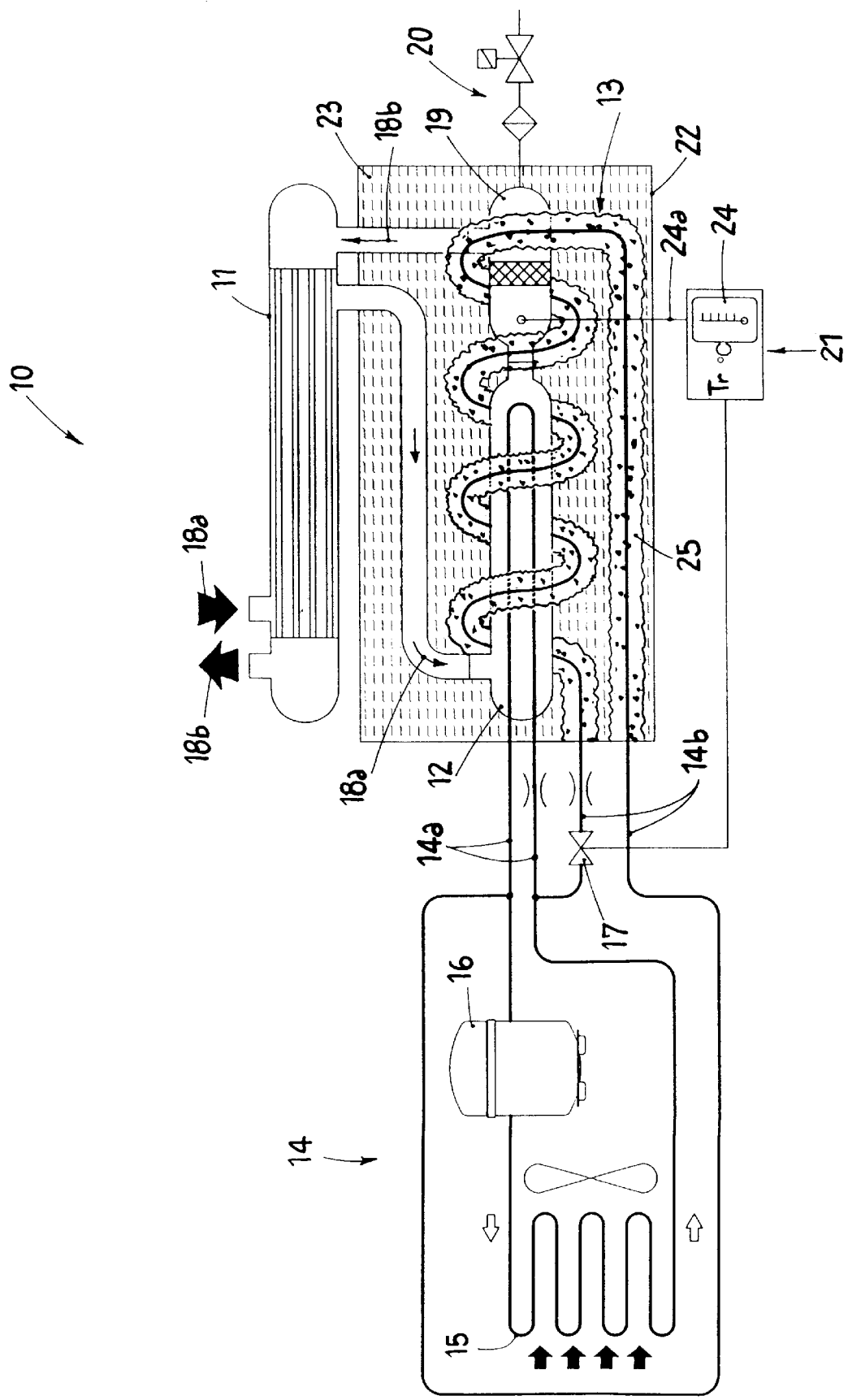

DRYING PLANT FOR COMPRESSED AIR

FIELD OF THE INVENTION

This invention concerns a drying plant for compressed air, suitable to be used in applications wherein dehumidified, almost totally dry compressed air has to be available.

The plant according to the invention is suitable to dry compressed air by cooling it substantially to dew point (about 3° C.), with lower running costs and higher performance compared with conventional drying plants.

BACKGROUND OF THE INVENTION

The state of the art includes applications wherein almost totally dry compressed air has to be available to avoid problems of corrosion and the formation of ice, both in distribution plants and in machines.

Among the drying plants most widely found in the state of the art are refrigeration drying plants, wherein the compressed air is cooled by means of a cooling system comprising at least a heat exchanger, in such a manner as to make the water contained in the air condense, and then separate it by separator means provided for this purpose and discharge it through suitable discharge devices.

At present two types of refrigeration drying plants are mainly used.

A first type, the so-called direct expansion type, uses at least a heat exchanger of the refrigerant/air type, connected to a refrigeration unit.

In this heat exchanger, the temperature of the compressed air, possibly already lowered by means of a pre-cooling heat exchanger of the air/air type located upstream, is lowered through direct exchange due to the contact between the walls defining the volume wherein the refrigerant circulates and the walls defining the volume wherein the compressed air to be dried circulates.

The air/air heat exchanger allows to carry out a partial energy recovery which by itself, however, does not allow to achieve any considerable energy saving or to increase to any large degree the overall thermal performance of the plant. In this type of plant, the cooling circuit is connected to the relative refrigerant/air exchanger by means of by pass valves or solenoid valves which allow to divide the flow of cooling fluid according to the delivery and/or temperature of the air to be processed.

This allows to prevent the water contained in the compressed air from freezing due to excessive cooling, but it does not ensure a proportional reduction of the overall energy consumption of the system.

Moreover, the cooling circuit is always switched on, irrespective of the fluctuating requirements of cooling capacity. This type of plant is therefore characterized by high efficiency because of the type of cooling (direct heat exchange between refrigerant and air) but has the disadvantage of high energy consumption because it can not reduce its capacity in direct proportion to a reduced load of the system.

A second type of refrigeration drying plant is the so-called (thermal mass) cycling type.

This type of plant has a configuration similar to that of direct expansion plants, with the difference that in the refrigerant/air heat exchanger the heat exchange does not occur directly but through a thermal mass, usually consisting of a liquid or a solid in particle form, located between the volume where the refrigerant circulates and the volume where the compressed air circulates.

In this second type of plant, the energy consumption is directly correlated to the volume and/or temperature of the air to be treated since, in the event that the volume of compressed air required by the user machines is reduced (and/or in the event of a lower temperature thereof), the excess cooling capacity produced is accumulated in the thermal mass.

In this way, the cooling circuit can be switched off for some periods of time, usually automatically according to the data monitored by a thermostat, and can continue to perform its cooling function as a result of the cooling capacity stored in and released by the thermal mass.

This possibility of using the cooling circuit cyclically allows to achieve a reasonable energy saving, proportionated to the load.

However, the quantity of latent cooling capacity accumulated by the thermal mass is not generally sufficient to ensure a high autonomy of the drying process when the refrigeration circuit is switched off, since during this stage the temperature of the thermal storage mass rises above the dew point temperature, so that the refrigeration circuit soon has to be re-started in order to ensure that the process continues.

In fact, the temperature of the thermal mass cannot be taken to very low values, for example less than zero ° C., because the thermal mass is directly in contact with the surfaces of the exchanger where the compressed air is flowing, and therefore a temperature of less than zero ° C. would lead to a risk of freezing the water contained in the compressed air.

This means that the cooling circuit has to be switched on and off with considerable frequency, which can cause a reduction in the working life of the drying plant, and can moreover reduce the energy saving which can be obtained with this type of plant.

Compared with the first type of direct exchange plant, plants of the thermal storage mass type, with thermal exchange of the indirect type, inevitably have a lower efficiency of heat exchange.

The present Applicant has designed and embodied this invention in order to supply a drying plant which will unite the advantages of the two types of conventional plants and eliminate the disadvantages in such a way as to ensure high performance and low energy consumption, and to obtain further advantages.

SUMMARY OF THE INVENTION

The invention is set forth and characterized in the main claim, while the dependent claims describe other innovative characteristics of the invention.

The main purpose of the invention is to achieve a drying plant for compressed air with a high efficiency thermal exchange and able to achieve considerable energy saving so as to considerably reduce running costs, while maintaining a closer control of the dew point.

To be more exact, the aim of the invention is to supply a drying plant wherein the energy consumption is substantially correlated to the quantity of compressed air actually required by the user machines and/or to the temperature of said air.

Another purpose of the invention is to achieve a plant able to dry the compressed air efficiently, conforming with the standard requirements.

A drying plant according to the invention comprises at least a refrigeration unit suitable to provide a cooling fluid to at least a first heat exchanger suitable to cool the compressed air to be treated substantially to its dew point temperature, at which temperature it is possible to separate and discharge the water vapor contained in said compressed air.

According to one characteristic of the invention, the first heat exchanger is immersed in a chamber containing a cooling liquid, for example water, suitable to act as a thermal mass to accumulate the excess thermal energy (cooling capacity) generated by the refrigeration unit compared with the capacity necessary to take the temperature of the compressed air to the dew point value.

According to the invention, the refrigeration unit of the plant according to the invention is equipped with a first refrigerant circuit suitable to feed the first heat exchanger during the normal functioning of the plant, and with a second refrigerant circuit which is selectively activated to feed a second heat accumulation exchanger, inserted in said chamber and also immersed in the cooling liquid, which mainly intervenes in the step when the refrigeration unit is automatically de-activated.

The second heat exchanger can be substantially of any type, for example with a simple smooth coil, finned coil, a pack of fins or other suitable type.

The second refrigeration circuit is activated when a control unit monitors that the temperature of the compressed air has reached the desired value of cooling, for example around its dew point (about 3° C.).

The second heat exchanger, immersed in the thermal mass consisting of the cooling liquid, but not in direct contact with the first exchanger, is of the type where the refrigerant has an expansion temperature of less than 0° C., and can even reach −10° C./−15° C.

Consequently, when the second cooling circuit is activated, a layer of ice is formed around the walls of the second exchanger, accumulating a quantity of latent cooling capacity which is first given up to the thermal mass consisting of the cooling liquid, and then by the thermal mass media to the first heat exchanger where the compressed air to be cooled is circulating.

During this step, the refrigeration unit can be switched off, since the cooling of the compressed air continues by giving up the latent heat possessed by the ice formed around the walls of the second exchanger.

This solution has the substantial advantage that the ice is not directly in contact with the compressed air. The ice exists in the presence of a larger volume of water which insures that the ice temperature remains at 0° C. and therefore there is no risk that the water contained in the compressed air can freeze.

The temperature of the thermal mass inside which the first exchanger is immersed therefore remains substantially constant, at a value of around 1+2° C., since the latent cold given up by the progressive melting of the ice is entirely transmitted to the compressed air to ensure the continuity of the cooling process until the compressed air reaches dew point temperature.

The refrigeration unit may be kept switched off for as long as the mass of melting ice is able to ensure the performance of the drying plant, that is for as long as the latent heat given up by the ice manages to ensure the correct cooling of the compressed air.

As soon as the control unit detects that the dew point temperature of the compressed air can no longer be maintained, the refrigeration unit is re-activated and the cooling conditions of the compressed air by direct exchange are restored.

It is obvious that in conditions of low delivery and temperature of the compressed air to be treated, the time the refrigeration unit is switched off can be extended longer, in proportion to the quantity of ice which has formed on the walls of the second exchanger, which entails a high energy saving.

According to a variant, upstream of the first exchanger there is a third heat exchanger suitable to make a first cooling treatment of the compressed air arriving from the distribution plant or from the user machines.

The compressed air can arrive to the third exchanger at a temperature normally between about 5 and about 50° C. in a saturated or non-saturated condition, and at a pressure normally between 5 and 16 bar.

According to another variant, the third heat exchanger is also immersed in the cooling liquid functioning as a thermal mass in order to recover energy.

BRIEF DESCRIPTION OF THE DRAWING

These and other characteristics of the invention will become clear from the following description of a preferential embodiment of the invention, given as a non-restrictive example with reference to the attached drawing which shows the functioning diagram of the drying plant according to the invention.

DETAILED DESCRIPTION OF PREFERRED EMBODIMENT

The drying plant 10 according to the invention shown schematically in the drawing comprises, in its essential parts, the following components:

a first heat exchanger 12 of the direct exchange type, suitable to take the compressed air to be treated substantially to its dew point temperature;

a second heat exchanger 13 of the heat accumulation type with an expansion temperature of less than 0° C., a third heat exchanger 11 for pre-cooling, a refrigeration unit 14 connected to the first 12 and second 13 heat exchangers, a condensation separator device 19, a condensation discharge device 20, a closed chamber 22 containing a cooling liquid 23 which functions as a thermal mass, and an electronic control unit 21.

The electronic control unit 21 is suitable to manage the functioning of the drying plant 10 and is connected to a plurality of probes and sensors suitable to detect at least the temperature of the compressed air to be dried 18a and/or the dried compressed air 18b and/or the mass temperature.

In this case, the electronic control unit 21 is connected to a thermostat 24 equipped with a temperature probe 24a suitable to monitor the temperature of the compressed air which exits from the first heat exchanger 12.

The refrigeration unit 14 comprises a compressor 16 and a condenser 15 of a conventional type, able to cool a cooling fluid suitable to circulate in a first circuit 14a and, selectively according to the working step of the plant, in a second circuit 14b.

The first circuit 14a is directly connected to the first heat exchanger 12 while the second circuit 14b is connected as a branch of the first refrigeration circuit 14a by means of an electrovalve 17 and feeds the refrigerant to the second heat exchanger 13.

In the first heat exchanger 12 the compressed air to be dried 18a, produced in any unit which is not shown here, for example a compression station, and pre-cooled to a desired temperature after passing into the third heat exchanger 11, is in direct contact with the outer surface of the tube defining the first circuit 14a. This contact between the compressed air and the cooling circuit causes the air to be cooled through direct exchange in a substantially conventional manner.

To be more exact, in the first heat exchanger 12, the compressed air to be dried 18a is cooled to a defined dew point temperature "Tr", for example around 3° C., which allows to ensure an almost complete condensation of the water vapor contained in the compressed air to be dried 18a.

The dew point temperature "Tr" can be set by intervening on the thermostat 24 connected to the electronic control unit 21, which is also suitable to operate the solenoid valve 17 to alternate the direction of the refrigerant to the refrigeration circuits 14a and 14b.

The water vapor is separated from the compressed air 18a by means of a separator device 19 and discharged by means of an automatic discharge device 20, both of a conventional type.

Therefore, in outlet from the separator device 19 we have de-humidified compressed air 18b which is sent back to the third heat exchanger 11, which is substantially of a conventional type, before finally leaving (exiting) the dryer.

According to a variant which is not shown here, in order to obtain an energy recovery, the third heat exchanger 11 is also immersed in the cooling liquid 23.

In the third exchanger 11 the temperature of the compressed air to be dried 18a is lowered from an inlet value normally around 35° C. (which may also reach 50° C.) to an outlet temperature of around 20+25° C., thus allowing the first heat exchanger 12 to do less work to lower the temperature of the compressed air to the dew point.

According to the main characteristic of the invention, both the first 12 and the second 13 exchanger are immersed in the cooling liquid 23 contained in the closed chamber 22.

In this case, the cooling liquid 23 consists of pure water and the second exchanger 13 consists of a coiled tube which surrounds the first exchanger 12.

The drying plant 10 according to the invention functions as follows:

During normal working conditions of the plant, the refrigeration unit 14 is active, refrigerant circulates through the first circuit 14a associated with the first exchanger 12 and the temperature of the compressed air is progressively lowered to the dew point by direct heat exchange with said first exchanger 12.

When the electronic control unit 21 detects, by means of the probe 24a of the thermostat 24, that the dew point temperature "Tr", has been reached, the electrovalve 17 is activated to send most of the refrigerant to the second refrigeration circuit 14b, causing the fluid to expand in the second exchanger 13.

Since the second exchanger 13 is of the type with a gas-expansion temperature of less than 0° C. and since it is immersed in the liquid 23, a mass of ice 25 forms around the walls of the second exchanger 13 such as to accumulate a quantity of latent cooling capacity proportional to the quantity of said mass.

The mass of ice 25 is not in contact with the walls of the first exchanger 12, therefore there is no risk that the compressed air circulating inside might freeze, also because the mass of water 23 in which the exchanger 12 is immersed does not completely freeze.

At this point, the refrigeration unit 14 can be switched off, and the cooling of the compressed air continues via the latent heat supplied by the ice 25 which has formed around the walls of the second exchanger 13.

The progressive melting of the ice, when the refrigeration unit 14 is switched off, allows to maintain the thermal mass (the liquid 23) in which the first exchanger 12 is immersed, at a substantially constant temperature of around 1+2° C., since the cold given up by the ice 25 to the liquid 23 is transmitted by the liquid 23 to the compressed air to maintain the continuity of the cooling process to dew point temperature. The temperature is adjustable for further energy saving, for example in summer, when a higher dew point is desired.

This allows to keep the refrigeration unit 14 switched off for the whole time during which the cooling capacity accumulated by the ice 25 are able to guarantee that the drying plant continues to perform, ensuring at the same time that it is impossible for the compressed air to freeze since the liquid 23 is always kept maintained at a temperature above 0° C.

This solution therefore allows to achieve energy saving when the air to be dried has a low volume or low temperature, since it increases the time the refrigeration unit 14 can be left switched off; it also allows to absorb load peaks above the nominal capacity, exploiting together the nominal cooling capacity of the main exchanger 12 and the residual capacity of the thermal mass consisting of the liquid 23 which receives latent cooling capacity from the accumulation exchanger 13.

The drying plant 10, according to the invention therefore has a cyclical functioning which provides a first working condition wherein the refrigeration unit 14 is switched on and feeds only the first exchanger 12, a second working condition wherein the refrigeration unit 14 is switched on and also feeds the second exchanger 13, with ice consequently forming on the walls of the exchanger 13, and a third working condition wherein the refrigeration unit 14 is switched off and the cooling continues by the latent heat of fusion of ice of the accumulation exchanger 13 and the thermal mass consisting of the liquid 23.

It is obvious that modifications and additions may be made to the drying plant as described heretofore, but these shall remain within the field and scope of the invention.

For example, instead of pure water, the cooling liquid 23 may consist of water to which substances have been added suitable to improve the accumulation of cooling capacity to be exploited as latent capacity when the refrigeration unit 14 is switched off.

Moreover, the electronic control unit 21 may be connected not only to the thermostat 24 but also to other probes or sensors such as for example a device suitable to control the pressure and/or flow rate of the compressed air, a temperature probe suitable to monitor the temperature of the cooling media or otherwise.

It is also obvious that, although the description refers to a specific example, a skilled person in the art shall certainly be able to achieve many other equivalent forms of the drying plant, but these shall all come within the field and scope of this invention.

What is claimed is:

1. Drying plant for compressed air suitable to dry compressed air by cooling it substantially to around its dew point, said plant comprising at least a first heat exchanger (12), for the direct cooling of the compressed air, selectively associated to a refrigeration unit (14) suitable to feed refrigerant to said first heat exchanger (12) by means of a first refrigeration circuit (14a), said plant comprising at least a condensation separator device (19), a condensation discharge device (20) and a control unit (21), the plant being characterized in that said first heat exchanger (12) is immersed in a chamber (22) containing a cooling liquid (23) suitable to act as a thermal storage mass to accumulate the excess cooling capacity generated by said refrigeration unit (14) with respect to the energy needed to lower the compressed air to dew point temperature, and in that said plant comprises a second heat exchanger (13) also immersed in said thermal storage mass and suitable to intervene mainly during a momentary de-activation of said refrigeration unit (14).

2. Drying plant as in claim 1, characterized in that said refrigeration unit (14) comprises at least a second refrigeration circuit (14b) suitable to selectively feed the refrigerant to said second heat exchanger (13).

3. Drying plant as in claim 1, characterized in that said second heat exchanger (13) is of the type wherein the expansion temperature of the cooling fluid is less than 0° C. and is positioned not in direct contact with said first heat exchanger (12).

4. Drying plant as in claim 1 inclusive, characterized in that second heat exchanger (13) consists of a smooth coil arranged around but not in contact with said first heat exchanger (12).

5. Drying plant as in claim 1 inclusive, characterized in that said second heat exchanger (13) consists of a finned coil arranged around but not in contact with said first heat exchanger (12).

6. Drying plant as in claim 1 inclusive, characterized in that said second heat exchanger (13) consists of a finned pack arranged around but not in contact with said first heat exchanger (12).

7. Drying plant as in claim 1, characterized in that second heat exchanger (13) is suitable to produce a mass of ice (25) on its walls when associated with the refrigeration unit (14) by means of said second refrigeration circuit (14b), said mass of ice (25) being suitable to accumulate thermal energy which is given up to the cooling liquid (23), and from the latter to said first heat exchanger (12), during said momentary de-activation of said refrigeration unit (14).

8. Drying plant as in claim 1, characterized in that said thermal energy is the latent heat of fusion of ice.

9. Drying plant as in claim 1, characterized in that said dew point temperature is around 3° C.

10. Drying plant as in claim 1, characterized in that said control unit (21) is suitable to switch the feed of the refrigerant from said first heat exchanger (12) to said second heat exchanger (13) when it is detected that the temperature of the compressed air has reached a value of around its dew point temperature.

11. Drying plant as in claim 1, characterized in that said control unit (21) is suitable to de-activate said refrigeration unit (14) for the whole time in which said mass of ice (25), by melting, is able to continue cooling the compressed air to its dew point temperature.

12. Drying plant as in claim 1, characterized in that it comprises a third heat exchanger (11) suitable to make a first cooling treatment on the compressed air before it is sent to said first heat exchanger (12).

13. Drying plant as in claim 12, characterized in that said third heat exchanger (11) is immersed in the cooling liquid (23).

14. Drying plant as in claim 1, characterized in that it is suitable to have a first working condition wherein said refrigeration unit (14) is switched on and feeds refrigeration to only the first heat exchanger (12), a second condition wherein said refrigeration unit (14) is switched on and also feeds refrigeration to said second exchanger (13), with a mass of ice (25) consequently forming on the walls of said second exchanger (13), and a third working condition wherein said refrigeration unit (14) is switched off and the cooling of the compressed air continues thanks to the progressive melting of said mass of ice (25).

15. Drying plant as in claim 14, characterized in that the duration of said third working condition is directly correlated at least to the volume and/or inlet temperature of the compressed air to be dried.

* * * * *